No. 608,451. Patented Aug. 2, 1898.
C. GOERGEN.
MUD GUARD.
(Application filed Nov. 30, 1897.)
(No Model.)

Attest
N. F. Smith
W. J. McCauley

Inventor:—
Charles Goergen.
By Higdon, Longan & Higdon
Atty's.

THE NORRIS PETERS CO., PHOTO-LITHO., WASHINGTON, D. C.

UNITED STATES PATENT OFFICE.

CHARLES GOERGEN, OF ST. LOUIS, MISSOURI.

MUD-GUARD.

SPECIFICATION forming part of Letters Patent No. 608,451, dated August 2, 1898.

Application filed November 30, 1897. Serial No. 660,323. (No model.)

*To all whom it may concern:*

Be it known that I, CHARLES GOERGEN, of the city of St. Louis, State of Missouri, have invented certain new and useful Improvements in Cycle Mud-Guards, of which the following is a full, clear, and exact description, reference being had to the accompanying drawings, forming a part thereof.

My invention relates to cycle mud-guards; and it consists of the novel construction, combination, and arrangement of parts hereinafter shown, described, and claimed.

Figure 1:
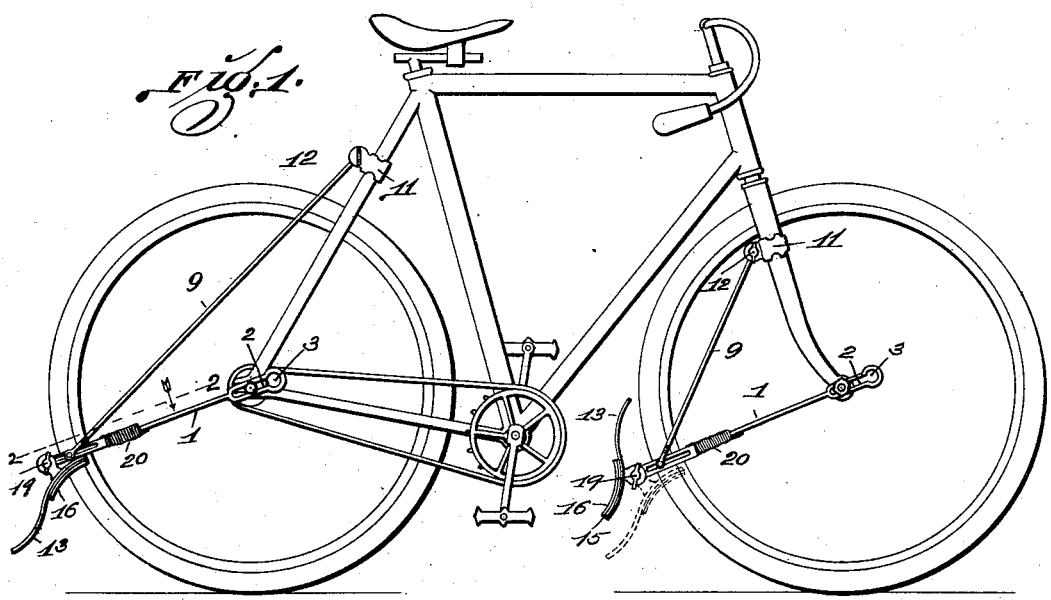
Figure 2:
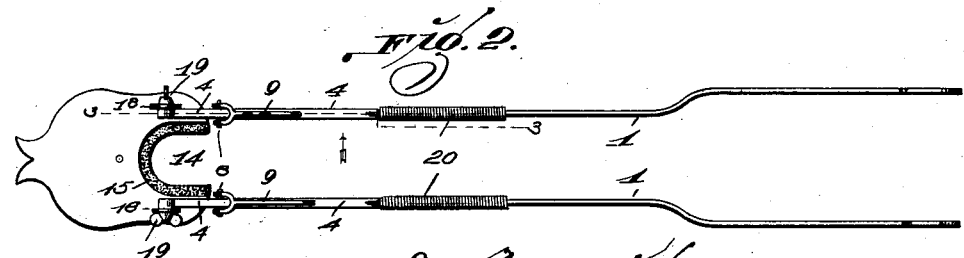
Figure 3:
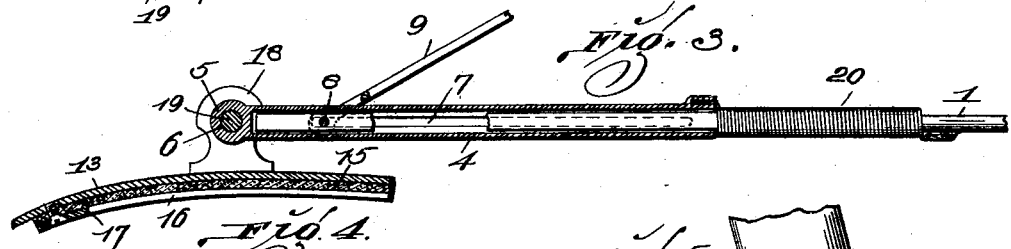
Figure 4:
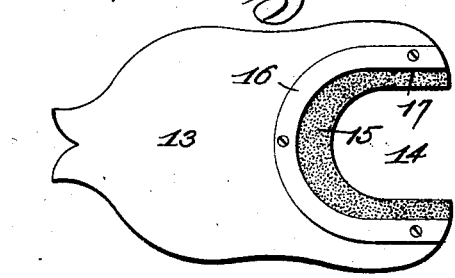
Figure 5:
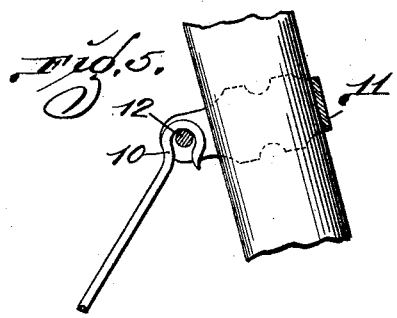

Figure 1 is a side elevation of a bicycle having a pair of my improved mud-guards in position as required for use. Fig. 2 is a top plan view of one of my improved mud-guards, which view is taken approximately on the line 2 2 of Fig. 1 and looking in the direction indicated by the arrow. Fig. 3 is an enlarged longitudinal sectional view taken approximately on the line 3 3 of Fig. 2. Fig. 4 is a view of the under side of the deflecting-plate made use of in carrying out my invention. Fig. 5 is a sectional view of the clip used for fastening the stay-rod of my improved mud-guard to the frame of the cycle.

Referring by numerals to the drawings, 1 1 indicate mating side rods, the forward ends of which are provided with slots 2, terminating in enlarged apertures 3. These side rods are located upon the axles of the wheels of the bicycle by passing the ends of said rods containing the enlarged apertures 3 over the nuts on said axles, which nuts have been previously loosened, then sliding said rods to the desired position, the ends of the axle operating in the slots 2, and then tightening the nuts on said axles to rigidly hold the rods in the desired position. The rear ends of the rods 1 are arranged to slide or telescope in sleeves 4, which sleeves are provided at their rear ends with heads 5, through which are transverse screw-threaded apertures 6. In the side walls of the sleeves 4 are mating slots 7, and pins 8 are passed through the rear ends of each of the side rods 1, said pins projecting through the slots 7. Secured to the protruding ends of said pins 8 are the lower bifurcated ends of stay-rods 9, there being one of these stay-rods for each of the rods 1, and the upper ends of said stay-rods 9 are provided with hooks 10. In the guard that is located upon the rear wheel of the bicycle these stay-rods 9 are somewhat longer than the rods of the guard for the front wheel.

When the guard is located upon the rear wheel of the bicycle, suitable clips 11 are located upon each of the members of the rear fork of the bicycle, and the hooks 10 are engaged around the thumb-screws 12 of said clips. When said thumb-screws 12 are tightened, the clips 11 are tightened upon the rear fork, and at the same time the hooks 10 are clamped between the ears of said clips. When the guard is located upon the front wheel of the bicycle, these clips 11 are located upon the members of the front fork of the bicycle.

13 indicates the deflector-plate, which is made of suitable thin material and when viewed in side elevation is in the form of a compound curve. In the forward end of this plate 13 is formed a semicircular recess 14, the edge of said recess being bordered by a section 15, of rubber, leather, or analogous material, the same being held to the under side of the plate 13 by a U-shaped strap 16, the forward edge 17 of which is serrated and turned at right angles to the body portion or toward the plate 13, so as to engage the rubber to firmly hold the same. Screws or other suitable fastening devices are used to fix the strap 16 to the plate 13. Ears 18 are formed on or fixed to the top surface of the plate 13 on each side of the semicircular recess 14, and against the inner faces of said ears 18 lie the heads 5, which are formed at the rear ends of the sleeves 4. Thumb-screws 19 pass through the ears 18 and into the screw-threaded apertures 6 in the heads 5.

A coil-spring 20 is located upon each of the rods 1 immediately in front of the sleeves 4, one end of each of said coil-springs being brazed to one of the sleeves 4, the opposite end of said coil-spring being brazed to the body of the rod 1. The tendency of the coil-springs 20 is to press the lower ends of the rods 1 into the sleeves 4.

When my improved mud-guard is in use, the deflector-plate 13 is turned downwardly, so that the tires of the wheels travel in the recess 14 in the forward end of said plate, which is, as previously stated, bordered by the section of rubber 15, and the thumb-screws 19 are now tightened in the heads 5, so as to rigidly hold the deflector-plate in this position. When the bicycle is driven forward by the rider, all of the mud, water, &c., will be thrown directly against the under side of the deflector-plate and will of its own accord fall from said plate onto the ground, and said mud and water can therefore in no wise be carried upwardly by the rotating wheel to be thrown on any part of the rider. As the section of rubber 15 is held yieldingly in contact with the tire of the wheel, any mud that might cling to the tire of the wheel and not be thrown off against the plate will be scraped off by said section of rubber before it is carried beyond the deflector-plate. When it is desired to throw the guard out of use, the thumb-screws 19 are loosened and the deflector-plate 13 is turned upwardly away from the tire of the wheel.

In Fig. 1 the guard on the rear wheel is shown in position as required for use, while the guard on the front wheel is thrown upwardly in the position it occupies when not in use.

By providing the slots 2 in the forward end of the rods 1 and by making the clips 11 adjustable upon the frame of the bicycle the guards can be located on wheels of different sizes, and it is essential that when locating the ends of the rods 1 upon the axles of the wheels they be thrown forward far enough to allow the springs 20 to be slightly expanded, so that the sections of rubber 15 will be held in proper contact with the tires of the wheels.

Mud-guards of my improved construction are very simple, easily adjusted, put on or removed from the bicycle, the deflecting-plates can be quickly turned upwardly and contact with the wheels, and said guards may be made of aluminium or other light material, are not in the way of the rider, and afford complete protection to the rider from mud and water that would otherwise be thrown on said rider from the wheels.

I claim—

The combination with a bicycle, of the rods 1 adjustably located upon the bicycle-axle, the slotted sleeves 4 sliding upon the lower ends of said rods, the retractile coil-springs 20 located upon said rods and connected to said sleeves, the stay-rods 9 adjustably held upon the bicycle-frame and connected to the outer ends of the first-mentioned rods, the deflecting-plate 13 pivotally connected to the outer ends of the sleeves, in which plate is formed a semicircular recess, a section of rubber located upon the under side of said plate and bounding said recess, and a strap 16 for holding said section of rubber in position, substantially as herein specified.

In testimony whereof I affix my signature in presence of two witnesses.

CHARLES GOERGEN.

Witnesses:
EDWARD E. LONGAN,
M. P. SMITH.